United States Patent
Kanno

[11] 3,914,026
[45] Oct. 21, 1975

[54] SHORT-DISTANCE CORRECTION DEVICE IN A PHOTOGRAPHIC LENS

[75] Inventor: Hideo Kanno, Kawasaki, Japan
[73] Assignee: Nippon Kogaku K.K., Tokyo, Japan
[22] Filed: Nov. 7, 1973
[21] Appl. No.: 413,609

[30] Foreign Application Priority Data
Nov. 13, 1972 Japan............... 47-129692

[52] U.S. Cl.............................. 350/255; 354/195
[51] Int. Cl.²......................................... G02B 7/04
[58] Field of Search............ 350/255, 187; 354/195, 354/286

[56] References Cited
UNITED STATES PATENTS

| | | | |
|---|---|---|---|
| 2,381,228 | 8/1945 | Schmidt | 350/255 X |
| 2,537,912 | 1/1951 | Reiss | 350/255 UX |
| 2,582,815 | 1/1952 | Bolsey | 350/255 X |
| 3,773,405 | 11/1973 | Sugano | 350/255 X |

Primary Examiner—John K. Corbin
Attorney, Agent, or Firm—Shapiro and Shapiro

[57] ABSTRACT

A photographic lens of the type which is capable of short-distance photography by the utilization of an intermediate ring includes a short-distance correction lens which forms a part of the photographic lens system and which is interlocked with a distance ring for movement with respect to the remainder of the lens system to thereby accomplish short-distance correction. The short-distance correction lens is movable in a first range of axial positions for the magnification range available during the mode in which the intermediate ring is not in use and in a second range of axial positions during the mode in which the intermediate ring is in use for accomplishing short-distance correction during both modes.

9 Claims, 5 Drawing Figures

SHORT-DISTANCE CORRECTION DEVICE IN A PHOTOGRAPHIC LENS

BACKGROUND OF THE INVENTION

1. Field of the Invention

This invention relates to a short-distance correction device which enables short-distance correction to be achieved when an intermediate ring is utilized with a photographic lens such as microlens in carrying out short-distance photography through such lens.

2. Description of the Prior Art

In close-up photography, great aberrations are experienced in that part of an optical system which is adjacent to an object to be photographed, depending on the optical conditions, and it is known in designing of photographic lenses to interlock a portion of the optical system with a distance ring so as to be movable with respect to the remainder of the optical system to thereby correct the aberrations.

Recently, however, long-focus lenses have become necessary to meet the requirement for a greater working distance. Also, in close-up photography as effected through a microlens or the like up to a magnification in which the size of an object image is equal to that of the object, the lens must be moved axially forward by an amount equal to the focal distance of the lens. This has led to a much greater length of the lens-moving helicoid and thus a greater overall size of the photographic lens.

To overcome the undesirable increase in lens size, the prior art has resorted to a system whereby the helicoid in the lens barrel is used to axially move the lens by an amount up to ½ of the full amount of lens movement and an intermediate ring as thick as ½ of the full amount of lens movement is interposed between the camera body and the lens barrel to axially move the lens by an amount greater than ½ of the full amount of lens movement. While this system is very effective to reduce the size of the photographic lens, it has given rise to the following problems when effecting a short-distance correction.

Where a picture is taken at magnifications from 1/∞X to ½X with the lens axially movable forward up to ½ of the full amount of lens movement, the short-distance correction involved ranges from a minimum amount for the 1/∞X magnification to a maximum amount for the ½X magnification. Where a picture is taken at magnifications from ½X to 1/1X with the said intermediate ring interposed between the camera body and the lens barrel and with the lens axially movable forward beyond ½ of the full amount of lens movement, the short-distance correction involved ranges from a minimum amount for the ½X magnification to a maximum amount for the 1/1X magnification.

Therefore, the correction amount for the 1/∞X magnification and that for the ½X magnification assume equal minimum values, while the correction amount for the ½X magnification and that for the 1/1X magnification assume equal maximum values. In other words, according to the prior art system, the short-distance correction for a magnification from 1/∞X to ½X has been equal to the short-distance correction for a magnification from ½X to 1/1X effected with the intermediate ring in use and thus the short-distance correction cannot be done over the full range of magnification from 1/∞X to 1/1X.

SUMMARY OF THE INVENTION

The object of the present invention is to provide a short-distance correction device for enabling short-distance correction to be achieved over the full range of magnification from 1/∞X to 1/1X in a camera's photographic lens of the type wherein an intermediate ring having a thickness equal to ½ of the full amount of lens movement is interposed between the camera body and the lens barrel for short-distance photography.

To achieve this object, the short-distance correction device of the present invention comprises a short-distance correction lens which forms part of the photographic lens system and which is interlocked with a distance ring so as to be movable with respect to the remainder of the optical system to thereby accomplish a short-distance correction. The short-distance correction lens is movable in a first range of axial positions for the magnification range available during the mode in which an intermediate ring is not in use and is movable in a second range of axial positions during the mode in which the intermediate ring is in use for thereby accomplishing short-distance correction during both modes.

The invention will become more fully apparent from the following detailed description of an embodiment thereof taken in conjunction with the accompanying drawings.

DESCRIPTION OF THE PREFERRED EMBODIMENT

Figure 1:
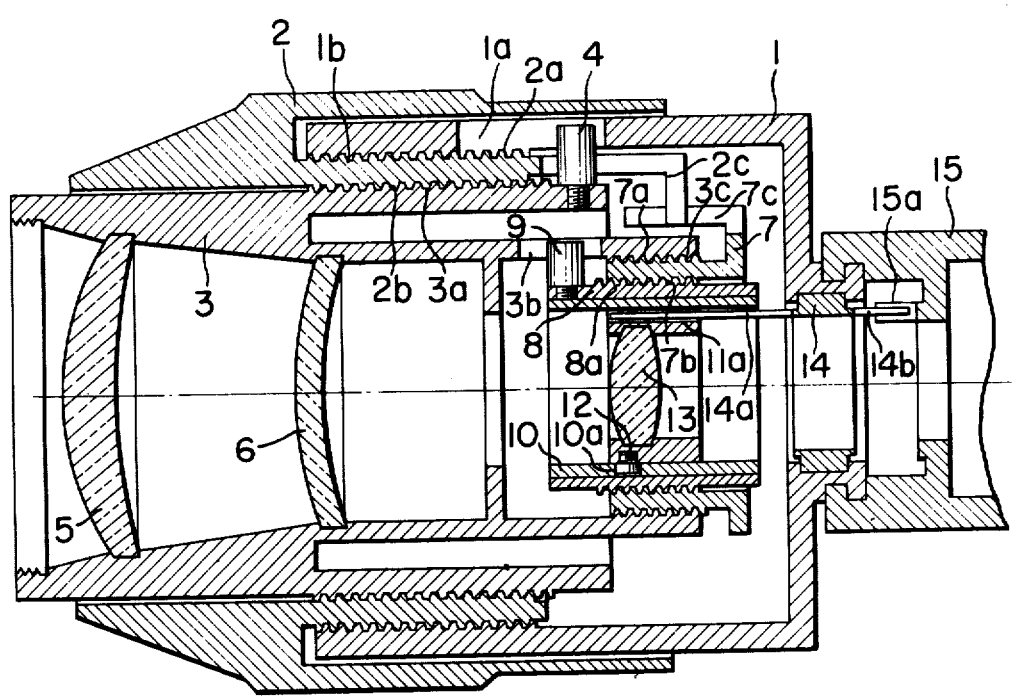
FIG. 1 is a longitudinal, cross-sectional view of a photographic lens including a short-distance correction device constructed in accordance with the invention.

Referring to FIGS. 1 to 4, there is shown a lens barrel, generally designated 1, which has a long, straight guide groove 1a extending therein along the optical axis and a helicoid portion 1b. A distance ring 2 has helicoid portions 2a and 2b and a connecting portion 2c. A lens holder ring 3 holds a first lens 5 and a second lens 6 and has a helicoid portion 3a threadably mating with the helicoid portion 2b of the distance ring 2, a long, straight guide portion 3b extending along the optical axis, a helicoid portion 3c, and a pin 4 secured to the helicoid portion 3a at one end thereof and engaged in the straight guide groove 1a of the lens barrel 1. Thus, the lens barrel 1, the distance ring 2 and lens holder ring 3 are helicoid-connected together so that rotation of the distance ring 2 can cause axial movement of the lens holder ring 3.

A first correction helicoid ring, designated by 7, has a helicoid portion 7a threadably mating with the helicoid portion 3c of the lens holder ring 3, a helicoid portion 7b threadably mating with a helicoid portion 8a formed in a second correction helicoid ring 8 to be described, and a long, straight guide groove 7c extending along the optical axis and engaged by the connecting portion 2c of the distance ring 2. As mentioned above, the second correction helicoid ring 8 has its helicoid portion 8a threadably mating with the helicoid portion 7b of the first correction helicoid ring 7, and has a pin 9 secured to the helicoid portion 8a at one end thereof and engaged in the straight guide groove 3b of the lens holder ring 3. The second correction helicoid ring 8 is movable only along the optical axis.

Figure 2:
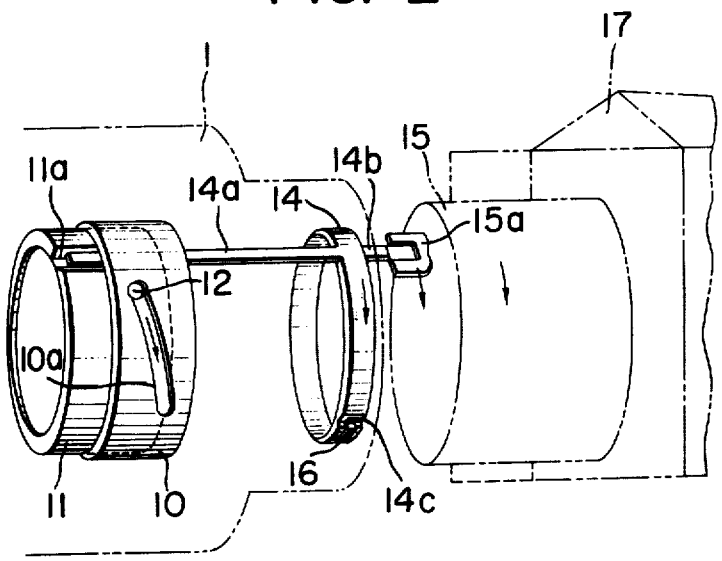
FIG. 2 is a perspective view of portions of the correction device of FIG. 1, this view additionally showing, in phantom, the intermediate ring connected to a camera body.
Figure 3:
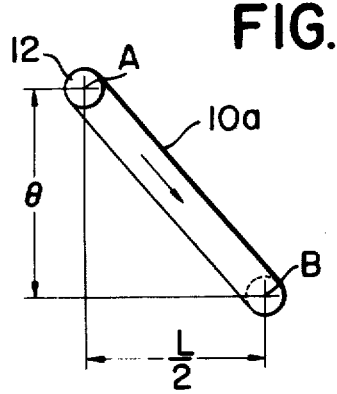
FIG. 3 illustrates the relationship of the pin and camming groove of the correction device.

A cam member 10 is formed integrally with the second correction helicoid ring 8 and has a camming groove 10a formed in the inner peripheral wall thereof as shown in FIGS. 2 and 3. In FIG. 3, letter $\theta$ represents the bayonet mounting angle and letter L the length of the short-distance correction. The lens barrel 1 and an intermediate ring 15, to be described, are joined by a conventional bayonet-type mounting, the intermediate ring being attached to the lens barrel only during the close-up focusing mode.

A lens holder ring 11 for holding a short-distance correction lens 13 is fitted within the cam member 10 for rotation about and sliding movement along the optical axis, and has a pin 12 engaged in the camming groove 10a.

An interlocking member 14 is fitted to the lens barrel 1 for rotation about the optical axis and is provided with a connecting portion 14a for engagement in the groove 11a formed in the lens holder ring 11 axially thereof and a connecting portion 14b for engagement with a cut-away portion 15a formed in an intermediate ring 15, which will be described. A click spring 16 is secured to the inside of the lens barrel, and a click groove 14c is formed in the interlocking member 14. Click spring 16 and click groove 14c together constitute a conventional click for releasably maintaining cam member 10 and lens holder ring 11 in their relative positions as shown in FIG. 2 when the intermediate ring is not in use. As mentioned above, the intermediate ring 15 is formed with the cut-away portion 15a for engagement with the connecting portion 14b of the interlocking member 14. Numeral 17 designates a camera body.

Figure 4A:
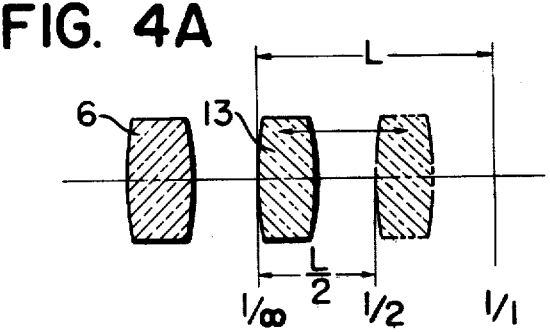
FIGS. 4A and 4B respectively illustrate the ranges of axial movement of the short-distance correction lens of the correction device when the photographic lens is utilized without and with an intermediate ring.

With the above-described construction, when the intermediate ring 15 is not in use, such as when the required magnification is $1/\infty \times$ to $\frac{1}{2}\times$, the lens holder ring 11 and the cam member 10 may be held together with the pin 12 on the ring 11 positioned in the camming groove 10a at one end thereof (see point A in FIG. 3) by the coaction between the click groove 14c and the click spring 16. Thus, rotation of the distance ring 2 in the direction for short-distance photography moves the lens holder ring 3 leftwardly as viewed in FIG. 1, while it causes the first correction helicoid member 7 to be rotated due to the engagement between the connecting portion 2c and the straight guide groove 7c and also causes the second correction helicoid member 8 to be moved rightwardly with respect to the lens holder ring 3. Consequently, the cam member 10, the correction lens holder ring 11 and the lens 13 are moved together with the second correction helicoid ring 8 in the same (rightward) direction within a first range of axial positions. The amount of the short-distance correction thus provided is ½ of the full correction amount as can be seen in FIG. 4A.

Now, where the intermediate ring 15 is used to take a picture at a magnification ranging from $\frac{1}{2}\times$ to $1/1\times$, it is required to establish an engagement between the cut-away portion 15a of the intermediate ring 15 and the connecting portion 14b of the interlocking member 14 and to rotate the lens barrel 1 through an angle equal to the bayonet mounting angle $\theta$ with respect to the intermediate ring to thereby permit the lens barrel 1 to be mounted on the intermediate ring 15 by the bayonet mounting.

Figure 4B:
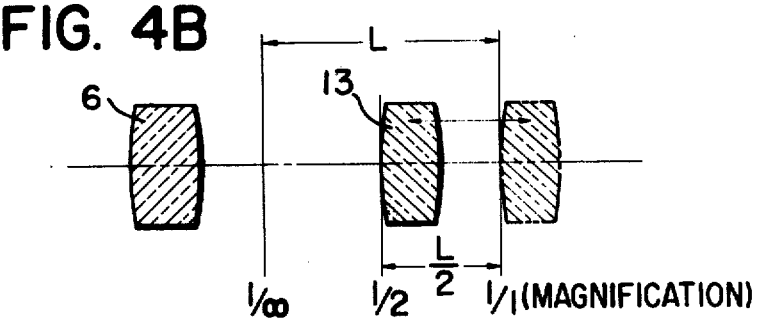

When the lens barrel 1 has been thus mounted on the intermediate ring 15, the aforesaid relative position in which the cam member 10 and the lens holder ring 11 are held by means of the click spring and click groove (in the manner shown in FIG. 2) is destroyed so that the lens holder 11 is displaced rightwardly by an amount L/2 with respect to the cam member 10 by the coaction between the camming groove 10a and the pin 12. Such displaced position of the lens holder 11 is represented by the pin 12 displaced to the point B in FIG. 3. This means that the standard position of the lens 13 has been displaced rightwardly by an amount L/2, as seen in FIG. 4B, from the position as assumed by this lens when the intermediate ring is not in use. Thus, as the distance ring is then rotated, the correction lens is moved within a second range of axial positions, ensuring a proper short-distance correction even for picture-taking at a magnification within the range of $\frac{1}{2}\times$ to $1/1\times$.

In the above-described embodiment, the intermediate ring 15 and the lens holder ring 11 are shown to be connected by means of the interlocking member 14, but alternatively, such interlocking member may be eliminated and the lens holder ring 11 may be formed with a connecting portion which is directly engageable with the cut-away portion 15a of the intermediate ring 15. In such latter case, of course, the engagement between the connecting portion of the lens holder ring 11 and the cut-away portion 15a of the intermediate ring 15 must be such as to permit sliding movement of the lens holder ring 11 along the optical axis.

Further, the illustrated embodiment is designed such that the action of mounting the intermediate ring 15 on the lens barrel 1 automatically results in movement of the lens 13, whereas the design may be changed so that the predetermined amount of movement of the lens 13 can be manually achieved without utilizing the mounting action of the intermediate ring 15.

Also, in the specific embodiment shown and described herein, wherein the short-distance correction results from movement of the lens 13 away from the lens 6, the camming groove 10a is formed in the cam member 10 to permit the lens holder ring 11 to be rightwardly moved as far as L/2 upon mounting of the intermediate ring 15, but it will be apparent that where the short-distance correction is achieved by movement of the lens 13 toward the lens 6, the camming groove 10a may be formed so as to permit the lens holder ring 11 to be moved as far as L/2 in the opposite (leftward) direction with respect to the cam member 10 upon mounting of the intermediate ring 15.

According to the present invention, as will thus be appreciated, in a photographic lens using an intermediate ring for short-distance photography, the short-distance correction can be achieved over the full range of magnification from the mode in which an intermediate ring is used to the mode in which no such ring is used.

It is believed that the advantages and improved results afforded by the short-distance correction device of the invention will be apparent from the foregoing detailed description of a preferred embodiment thereof. It will be apparent that various modifications and changes may be made without departing from the spirit and scope of the invention as sought to be defined in the following claims.

I claim:

1. A photogtraphic lens including a short-distance correction device, the photographic lens being adapted for use in a first mode for close-up photography wherein the photographic lens is mounted on a camera body by means of an intermediate ring and being adapted for use in a second mode wherein the photographic lens is directly mounted on a camera body, said correction device comprising a corrections lens cooperable with a distance ring on the photographic lens for varying the axial position of the correction lens in the photographic lens in response to rotation of the distance ring and means for selecting a first range of axial positions for the correction lens when the photographic lens is used in said first mode and a second range of axial positions for the correction lens when the photographic lens is used in said second mode, whereby short-distance correction is achieved during both the first and second modes.

2. A photographic lens as set forth in claim 1, wherein the means for selecting the first and second ranges of positions for the correction lens is cooperable with means provided by the intermediate ring for automatically selecting the first range when the photographic lens and the intermediate ring are connected together.

3. A photographic lens as set forth in claim 2, wherein the means for selecting the first and second ranges of positions for the correction lens comprises means for rotating the correction lens through a predetermined angle and means provided by the correction device for imparting a predetermined amount of axial movement to the correction lens when it is rotated through said predetermined angle.

4. A photographic lens as set forth in claim 3, wherein said means provided by the correction device for imparting axial movement to the correction lens comprises a pin received by a camming slot.

5. A photographic lens as set forth in claim 3, wherein the means for rotating the correction lens through a predetermined angle is an interlocking member rotatably supported by the photographic lens, said interlocking member having one end cooperable with means provided by the correction lens and having its other end cooperable with said means provided by the intermediate ring.

6. A photographic lens as set forth in claim 3, wherein said correction device further includes means for releasably maintaining the correction lens in the second range when the photographic lens is not connected to an intermediate ring.

7. A photographic lens as set forth in claim 1, wherein the means for selecting the first and second ranges of positions of the correction lens comprises means for rotating the correction lens through a predetermined angle and means provided by the correction device for imparting a predetermined amount of axial movement to the correction lens when the correction lens is rotated through said predetermined angle.

8. A photographic lens as set forth in claim 7, wherein said means provided by the correction device for imparting axial movement to the correction lens comprises a pin received by a camming slot.

9. A photographic lens as set forth in claim 1, wherein said correction device further includes means for releasably maintaining said correction lens in said second range of positions.

* * * * *